(12) United States Patent
Kudo (10) Patent No.: US 11,189,249 B2
(45) Date of Patent: Nov. 30, 2021

(54) OPERATION METHOD FOR HEAD-MOUNTED DISPLAY DEVICE AND HEAD-MOUNTED DISPLAY DEVICE

(71) Applicant: SEIKO EPSON CORPORATION, Tokyo (JP)

(72) Inventor: Yusuke Kudo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/078,226

(22) Filed: Oct. 23, 2020

(65) Prior Publication Data

US 2021/0125585 A1 Apr. 29, 2021

(30) Foreign Application Priority Data

Oct. 23, 2019 (JP) .............................. JP2019-192542

(51) Int. Cl.
*G09G 5/37* (2006.01)
*G09G 5/38* (2006.01)
*G02B 27/01* (2006.01)

(52) U.S. Cl.
CPC ........... *G09G 5/37* (2013.01); *G02B 27/0172* (2013.01); *G09G 5/38* (2013.01); *G02B 2027/0138* (2013.01); *G02B 2027/0178* (2013.01); *G09G 2340/0464* (2013.01)

(58) Field of Classification Search
CPC .................................................. G02B 27/0172
See application file for complete search history.

(56) References Cited

U.S. PATENT DOCUMENTS

| 10,579,320 | B2 | 3/2020 | Miyasaka et al. |
| 10,663,844 | B2 | 5/2020 | Urano et al. |
| 2017/0161956 | A1* | 6/2017 | Fu .......................... G06F 1/1686 |
| 2019/0197989 | A1 | 6/2019 | Kimura |

FOREIGN PATENT DOCUMENTS

| JP | 2018-174003 A | 11/2018 |
| JP | 2019-110407 A | 7/2019 |
| JP | 2019-114049 A | 7/2019 |

* cited by examiner

*Primary Examiner* — Gustavo Polo
(74) *Attorney, Agent, or Firm* — Dority & Manning, P.A.

(57) ABSTRACT

An operation method for a head-mounted display device including a display section configured to transmit outside scene light representing an outside scene appearing in a visual field of a user and display an object image showing an object includes receiving imaging data generated by an imaging device imaging a specific region of the outside scene, estimating, based on the imaging data, a specific display range in which the specific region is displayed in the display section, and determining, based on a result of the estimation, a position of the object image in the display section.

13 Claims, 9 Drawing Sheets

OPERATION METHOD FOR HEAD-MOUNTED DISPLAY DEVICE AND HEAD-MOUNTED DISPLAY DEVICE

The present application is based on, and claims priority from JP Application Serial Number 2019-192542, filed Oct. 23, 2019, the disclosure of which is hereby incorporated by reference herein in its entirety.

BACKGROUND

1. Technical Field

The present disclosure relates to an operation method for a head-mounted display device and the head-mounted display device.

2. Related Art

JP-A-2019-110407 (Patent Literature 1) describes a PC (Personal Computer) capable of operating a projector, which is an example of a display device. The PC described in Patent Literature 1 displays an operation screen for operating the projector.

There is also known a head-mounted display device including a display section configured to transmit an outside scene appearing in the visual field of a user and display an object image showing an object.

When a head-mounted display device is used as a device for operating the projector instead of the PC described in Patent Literature 1, the head-mounted display device uses the operation screen described in Patent Literature 1, as an object image.

In such a situation, when the user of the head-mounted display device views a display image displayed on a display surface by the projector, it is likely that the object image is less easily seen depending on the position of the display image appearing in the visual field of the user.

SUMMARY

An operation method for a head-mounted display device according to the present disclosure is an operation method for a head-mounted display device including a display section configured to transmit outside scene light representing an outside scene appearing in a visual field of a user and display an object image showing an object, the operation method including: receiving imaging data generated by an imaging device imaging a specific region of the outside scene; estimating, based on the imaging data, a specific display range in which the specific region is displayed in the display section; and determining, based on a result of the estimation, a position of the object image in the display section.

A head-mounted display device according to the present disclosure is a head-mounted display device including a display section configured to transmit outside scene light representing an outside scene appearing in a visual field of a user and display an object image showing an object, the head-mounted display device including: an imaging-data receiving section configured to receive imaging data generated by an imaging device imaging a specific region of the outside scene; an estimating section configured to estimate, based on the imaging data, a specific display range in which the specific region is displayed in the display section; and a determining section configured to determine, based on a result of the estimation, a position of the object image in the display section.

DESCRIPTION OF EXEMPLARY EMBODIMENTS

A: First Embodiment

A1: Overview of a Display System 1000

Figure 1:
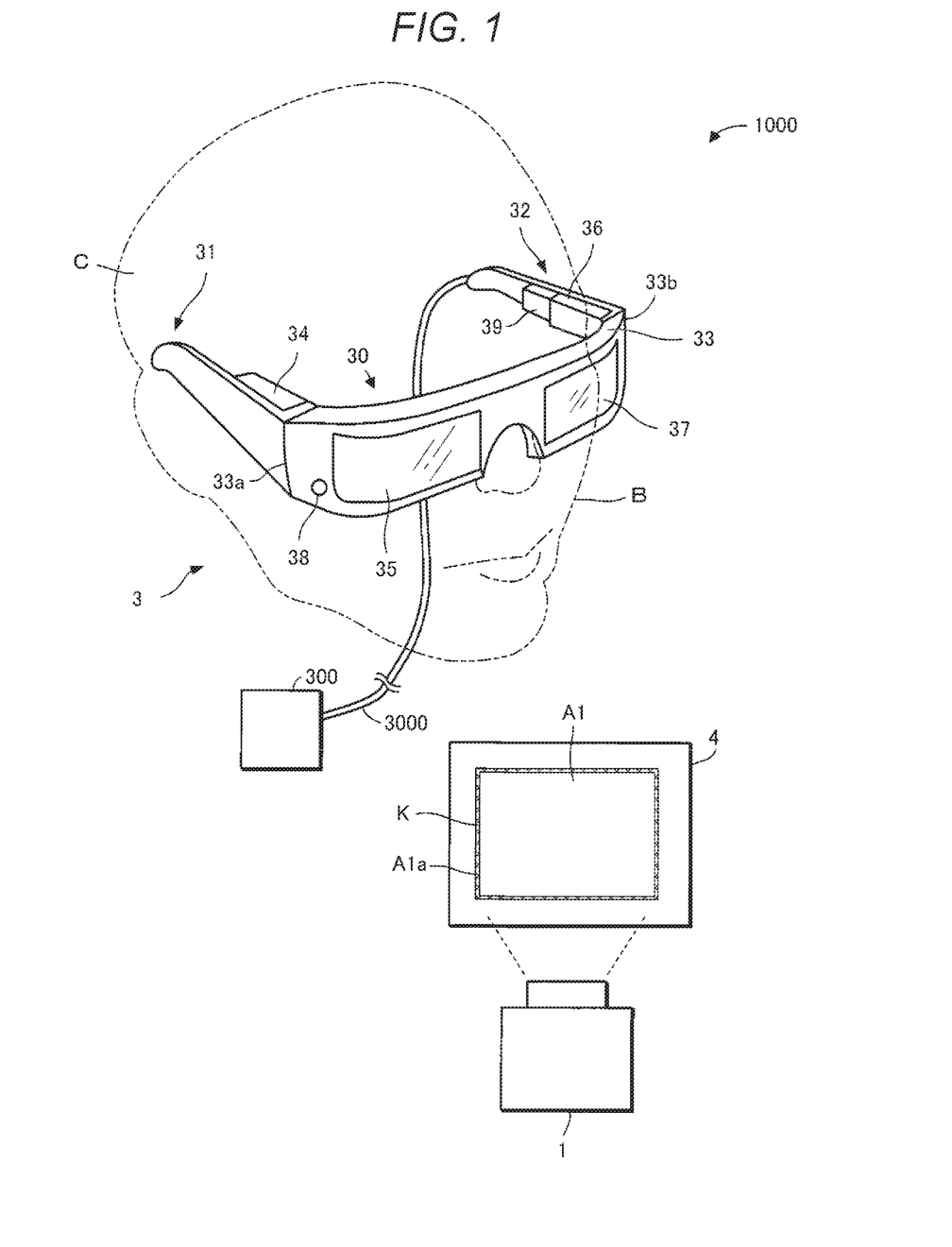
FIG. 1 is a diagram showing a display system according to a first embodiment.

FIG. 1 is a diagram showing a display system 1000 according to a first embodiment. The display system 1000 includes a projector 1 and an HMD (Head Mounted Display) 3. The projector 1 is an example of a display device, more specifically, an operation target display device. The display device is not limited to the projector and may be a display, for example, an FPD (Flat Panel Display). The FPD is, for example, a liquid crystal display, a plasma display, or an organic EL (Electro Luminescence) display.

The projector 1 projects an image onto a projection surface 4 to thereby display the image on the projection surface 4. For example, the projector 1 projects a display image A1 onto the projection surface 4 to thereby display the display image A1 on the projection surface 4. The display image A1 is an example of a display target image.

The display image A1 includes a marker K. The marker K has a frame-like shape representing an outer edge A1a of the display image A1. The marker K may be away from the outer edge A1a. The marker K has a portion located further on the inner side than the outer edge A1a. The marker K is used to specify a range in which the display image A1 is located. The marker K is shown, for example, in a form perceptible by a user B.

The projection surface 4 is, for example, a screen. The projection surface 4 is not limited to the screen and may be, for example, a part of a wall, a door, or a whiteboard. The projection surface 4 is an example of a display surface and a specific region.

The HMD 3 is a head-mounted display device. The HMD 3 is worn by the user B. The HMD 3 controls the projector 1.

A2. An Example of the Projector 1

Figure 2:
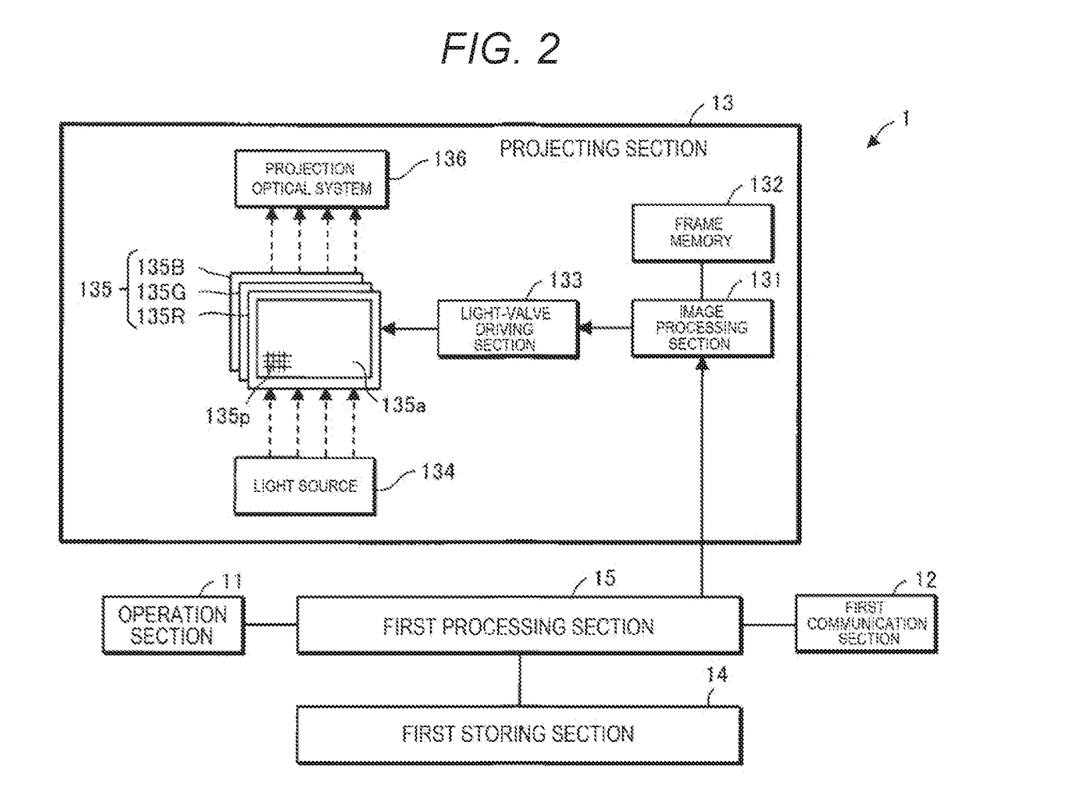
FIG. 2 is a diagram showing an example of a projector.

FIG. 2 is a diagram showing an example of the projector 1. The projector 1 includes an operation section 11, a first communication section 12, a projecting section 13, a first storing section 14, and a first processing section 15.

The operation section 11 is, for example, various operation buttons, an operation key, or a touch panel. The operation section 11 is provided in a housing of the projector 1. The operation section 11 receives input operation by the user B.

The first communication section 12 communicates with the HMD 3, specifically, a second communication section 391 shown in FIG. 4 explained below by wire or radio. The first communication section 12 communicates with the second communication section 391 through, for example, wireless LAN (Local Area Network). A communication scheme of wireless communication between the first communication section 12 and the second communication section 391 is not limited to the wireless LAN and may be other communication schemes, for example, Bluetooth. Bluetooth is a registered trademark.

The projecting section 13 projects the display image A1 onto the projection surface 4 to thereby display the display image A1 on the projection surface 4. The projecting section 13 includes an image processing section 131, a frame memory 132, a light-valve driving section 133, a light source 134, a liquid crystal light valve for red 135R, a liquid crystal light valve for green 135G, a liquid crystal light valve for blue 135B, and a projection optical system 136. In the following explanation, when it is unnecessary to distinguish the liquid crystal light valve for red 135R, the liquid crystal light valve for green 135G, the liquid crystal light valve for blue 135B from one another, these liquid crystal light valves are referred to as "liquid crystal light valve 135".

The image processing section 131 is configured by a single or a plurality of circuits such as image processors. The image processing section 131 receives image data from, for example, the first processing section 15. The image processing section 131 may receive image data from a not-shown image supply device. The image supply device is, for example, a PC. The image supply device is not limited to the PC and may be, for example, a tablet terminal, a smartphone, a video player, a DVD (Digital Versatile Disc) player, a Blue-ray disc player, a hard disc recorder, a television tuner device, or a video game machine.

The image processing section 131 develops image data in the frame memory 132. The frame memory 132 is configured by a storage device such as a RAM (Random Access Memory). The image processing section 131 applies image processing to the image data developed in the frame memory 132 to thereby generate an image signal.

The image processing executed by the image processing section 131 includes, for example, geometric correction processing for correcting trapezoidal distortion of an image projected by the projecting section 13. The image processing section 131 may execute other image processing, for example, resolution conversion processing in addition to the geometric correction processing. In the resolution conversion processing, the image processing section 131 converts the resolution of image data into, for example, the resolution of the liquid crystal light valve 135. The other image processing is not limited to the resolution conversion processing. The other image processing may be, for example, OSD (On Screen Display) processing for superimposing an OSD image on an image indicated by image data provided from the image supply device.

The light-valve driving section 133 is configured by a circuit such as a driver. The light-valve driving section 133 generates a driving voltage based on the image signal provided from the image processing section 131. The light-valve driving section 133 applies the driving voltage to the liquid crystal light valve 135 to thereby drive the liquid crystal light valve 135.

The light source 134 is, for example, an LED (light emitting diode). The light source 134 is not limited to the LED and may be, for example, a Xenon lamp, an ultrahigh pressure mercury lamp, or a laser light source. The light source 134 emits light. The light emitted from the light source 134 is made incident on a not-shown integrator optical system. The integrator optical system reduces fluctuation in a luminance distribution in the light emitted from the light source 134. The light emitted from the light source 134 passes through the integrator optical system and is thereafter separated into color light components of red, green, and blue, which are the three primary colors of light, by a not-shown color separation optical system. The color light component of red is made incident on the liquid crystal light valve for red 135R. The color light component of green is made incident on the liquid crystal light valve for green 135G. The color light component of blue is made incident on the liquid crystal light valve for blue 135B.

The liquid crystal light valve 135 is configured by a liquid crystal panel or the like in which liquid crystal is present between a pair of transparent substrates. The liquid crystal light valve 135 includes a rectangular pixel region 135a including a plurality of pixels 135p located in a matrix shape. In the liquid crystal light valve 135, a driving voltage based on an image signal is applied to the liquid crystal for each of the pixels 135p. When the light-valve driving section 133 applies the driving voltage to the pixels 135p, the pixels 135p are set to a light transmission rate based on the driving voltage. The light emitted from the light source 134 passes through the pixel region 135a to be modulated. Accordingly, an image based on the image signal is formed for each of the color lights. The liquid crystal light valve 135 is an example of a light modulation device.

Images having the colors are combined for each of the pixels 135p by a not-shown color combination optical system. Accordingly, a color image is generated. The color image is projected via the projection optical system 136. The projection optical system 136 is moved by a not-shown lens shift mechanism. The position of the display image A1 on the projection surface 4 is moved by the movement of the projection optical system 136. A function of moving the position of the display image A1 on the projection surface 4 according to the movement of the projection optical system 136 can be referred to as "lens shift function".

The first storing section 14 is a recording medium readable by the first processing section 15. The first storing section 14 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM.

The first storing section 14 stores a control program to be executed by the first processing section 15 and various data to be used by the first processing section 15.

The first processing section 15 is configured by, for example, a single or a plurality of processors. As an example, the first processing section 15 is configured by a single or a plurality of CPUs (Central Processing Units). A part or all of functions of the first processing section 15 may be realized by a circuit such as a DSP (Digital Signal Processor), an ASIC (Application Specific Integrated Circuit), a PLD (Programmable Logic Device), or an FPGA (Field Programmable Gate Array). The first processing section 15 executes various kinds of processing in parallel or sequentially. The first processing section 15 reads a control program from the first storing section 14. The first processing section 15 executes the control program read from the first storing section 14 to thereby execute various operations.

A3. An Example of the HMD 3

Referring back to FIG. 1, the HMD 3 includes a main body 30 and an operation input section 300. The operation input section 300 is electrically connected to the main body 30 via a connection cord 3000. The operation input section 300 may be electrically connected to the main body 30 by radio rather than wire. The operation input section 300 is, for example, a portable operation panel. The operation input section 300 receives operation by the user B. The operation input section 300 outputs operation data based on the operation by the user B to the main body 30.

The main body 30 is an eyeglass-type wearable device worn on a head C of the user B. The main body 30 is not limited to the eyeglass-type wearable device. The main body 30 only has to be a device worn on the head C of the user B.

A4. An Example of the Main Body 30

Figure 3:
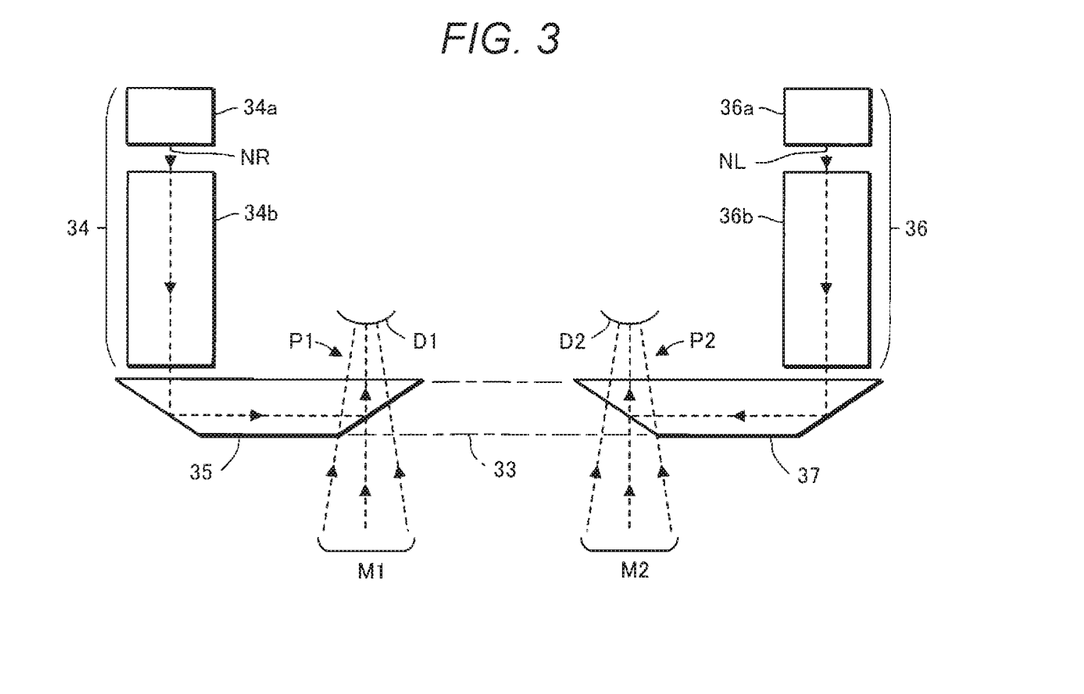
FIG. 3 is a schematic diagram showing the configuration of an optical system included in a main body.

FIG. 3 is a schematic diagram showing the configuration of an optical system included in the main body 30. The main body 30 is explained below with reference to FIGS. 1 and 3. The main body 30 includes a right holding section 31, a left holding section 32, a frame 33, a right display unit 34, a right light guide plate 35, a left display unit 36, a left light guide plate 37, a camera 38, and a control device 39.

The right holding section 31 extends to the rear of the main body 30 from a right end portion 33a of the frame 33. The left holding section 32 extends to the rear of the main body 30 from a left end portion 33b of the frame 33.

Figure 6:
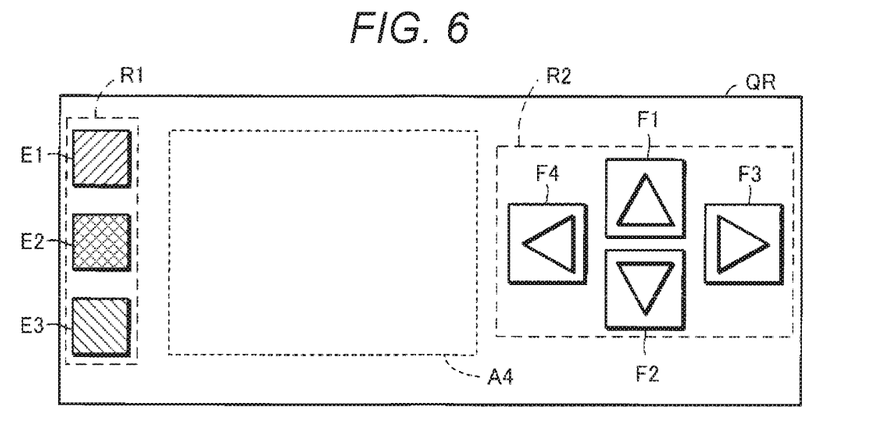
FIG. 6 is a diagram showing an example of a right image.

The right display unit 34 outputs image light NR for the right eye. In the following explanation, the image light NR for the right eye is referred to as "right image light NR". As illustrated in FIG. 6 referred to below, a right image QR indicated by the right image light NR includes a first operation image R1 and a second operation image R2. In the following explanation, when it is unnecessary to distinguish the first operation image R1 and the second operation image R2 from each other, these operation images are referred to as "operation image R". The right image QR and the operation image R are respectively not limited to the images shown in FIG. 6 and can be changed as appropriate.

The first operation image R1 shows a first operation section E1, a second operation section E2, and a third operation section E3. The second operation image R2 shows a fourth operation section F1, a fifth operation section F2, a sixth operation section F3, and a seventh operation section F4. Details of the first operation section E1, the second operation section E2, the third operation section E3, the fourth operation section F1, the fifth operation section F2, the sixth operation section F3, and the seventh operation section F4 are explained below. When it is unnecessary to distinguish the first operation section E1, the second operation section E2, the third operation section E3, the fourth operation section F1 the fifth operation section F2, the sixth operation section F3, and the seventh operation section F4 from one another, these operation sections are referred to as "operation section E".

The operation section E receives operation on the projector 1. The shape of the operation section E is not limited to a shape shown in FIG. 6 and can be changed as appropriate. The number of operation sections E is not limited to the number shown in FIG. 6 and can be changed as appropriate. The operation section E is an example of an object. The operation image R is an example of an object image.

The right display unit 34 includes, as illustrated in FIG. 3, a right-image output section 34a and a right optical system 34b. The right-image output section 34a is, for example, an OLED (Organic Light Emitting Diode). The OLED is referred to as organic EL display as well. The right-image output section 34a is not limited to the OLED and may be, for example, a liquid crystal display with a backlight or a plasma display. The right image output section 34a outputs the right image light NR. The right optical system 34b includes a collimate lens that collimates the right image light NR output from the right-image output section 34a into a light beam in a parallel state. The right image light NR is output to the right light guide plate 35 after being collimated into the light beam in the parallel state.

The right light guide plate 35 is, for example, a prism. The right light guide plate 35 transmits outside scene light representing an outside scene appearing in the visual field of the user B and displays an object image showing an object.

The right light guide plate 35 guides the right image light NR to a right eye D1 of the user B. The right light guide plate 35 further guides first outside scene light M1 to the right eye D1 of the user B. The first outside scene light M1 represents the outside scene appearing in the visual field of the user B. The outside scene represented by the first outside scene light M1 can be referred to as "a view reflected on the visual field of the right eye D1 of the user B in a situation in which the right image light NR is not made incident on the right eye D1 of the user B" as well. The outside scene represented by the first outside scene light M1 can be referred to as "a scene reflected on the visual field of the right eye D1 of the user B in a situation in which the right image light NR is not made incident on the right eye D1 of the user B" as well. The right light guide plate 35 superimposes the right image light NR with the first outside scene image M1 to thereby generate first superimposed light P1. The right light guide plate 35 guides the first superimposed light P1 to the right eye D1 of the user B. The first superimposed light P1 indicates a first superimposed image T1 illustrated in FIG. 7 referred to below.

The left display unit 36 outputs image light NL for the left eye. In the following explanation, the image light NL for the left eye is referred to as "left image light NL". A left image QL indicated by the left image light NL is an image generated by applying a change based on a binocular parallax to the right image QR. Accordingly, when the right image light NR is made incident on the right eye D1 of the user B and the left image light NL is made incident on a left eye D2 of the user B, the user B visually recognizes the operation image R included in the right image QR and the operation image R included in the left image QL as a common operation image R.

The left display unit 36 includes a left-image output section 36a and a left optical system 36b. The left-image output section 36a is, for example, an OLED. The left-image output section 36a is not limited to the OLED and may be, for example, a liquid crystal display with a backlight or a plasma display. The left-image output section 36a outputs the left image light NL. The left optical system 36b includes a collimate lens that collimates the left image light NL output from the left-image output section 36a into a light beam in a parallel state. The left image light NL is output to the left light guide plate 37 after being collimated into the light beam in the parallel state.

The left light guide plate 37 is, for example, a prism. The left light guide plate 37 is another example of the display section. The left light guide plate 37 transmits outside scene light representing an outside scene appearing in the visual field of the user B and displays an object image showing an object.

The left light guide plate 37 guides the left image light NL to the left eye D2 of the user B. The left light guide plate 37 further guides second outside scene light M2 to the left eye D2 of the user B. The second outside scene light M2 represents the outside scene appearing in the visual field of the user B. The outside scene represented by the second outside scene light M2 can be referred to as "a view reflected on the visual field of the left eye D2 of the user B in a situation in which the left image light NL is not made incident on the left eye D2 of the user B" as well. The outside scene represented by the second outside scene light M2 can be referred to as "a scene reflected on the visual field of the left eye D2 of the user B in a situation in which the left image light NL is not made incident on the left eye D2 of the user B" as well. The left light guide plate 37 superimposes the left image light NL with the second outside scene light M2 to thereby generate second superimposed light P2. The left light guide plate 37 guides the second superimposed light P2 to the left eye D2 of the user B.

Accordingly, when the user B wears the main body 30, the user B is capable of visually recognizing the outside scene, the right image light NR, and the left image light NL.

The camera 38 shown in FIG. 1 is an example of an imaging device. The camera 38 includes a light receiving optical system such as a lens and an imaging element that converts light condensed by the light receiving optical system into an electric signal. The imaging element is, for example, a CCD (Charge Coupled Device) image sensor that receives light in an infrared region and a visible light region. The imaging element is not limited to the CCD image sensor and may be, for example, a CMOS (Complementary Metal Oxide Semiconductor) image sensor that receives lights in the infrared region and the visible light region.

The camera 38 is provided in the frame 33. The camera 38 sets the front of the main body 30 as an imaging target region. Accordingly, when the main body 30 is worn by the user B like eyeglasses, the camera 38 sets at least apart of the visual field of the user B as the imaging target region. Accordingly, the camera 38 images a specific region of an outside scene visually recognized by the user B through the right light guide plate 35 and the left light guide plate 37.

The camera 38 generates imaging data by imaging the imaging target region. The imaging data indicates a captured image representing the imaging target region. In this embodiment, the camera 38 is disposed in the frame 33 such that the center of the captured image coincides with the center of the visual field of the user B. The camera 38 is located between the right light guide plate 35 and the right holding section 31. The position of the camera 38 is not limited to the position between the right light guide plate 35 and the right holding section 31. For example, the position of the camera 38 may be the position between the right light guide plate 35 and the left light guide plate 37 or between the left light guide plate 37 and the left holding section 32. The camera 38 may be provided in the right holding section 31 or may be provided in the left holding section 32. Even when the camera 38 is disposed in such a position, it is desirable that the center of the captured image coincides with the center of the visual field of the user B. The center of the captured image may be different from the center of the visual field of the user B.

The camera 38 may not be included in the HMD 3. In this case, the camera 38 functioning as an external device is attached to, for example, the HMD 3.

The control device 39 is provided in the left holding section 32. The control device 39 may be provided in the frame 33 rather than in the left holding section 32. The control device 39 may be provided in the right holding section 31. The control device 39 receives imaging data from the camera 38. The control device 39 receives operation data from the operation input section 300. The control device 39 controls the projector 1 using the imaging data and the operation data.

A5. An Example of the Control Device 39

Figure 4:
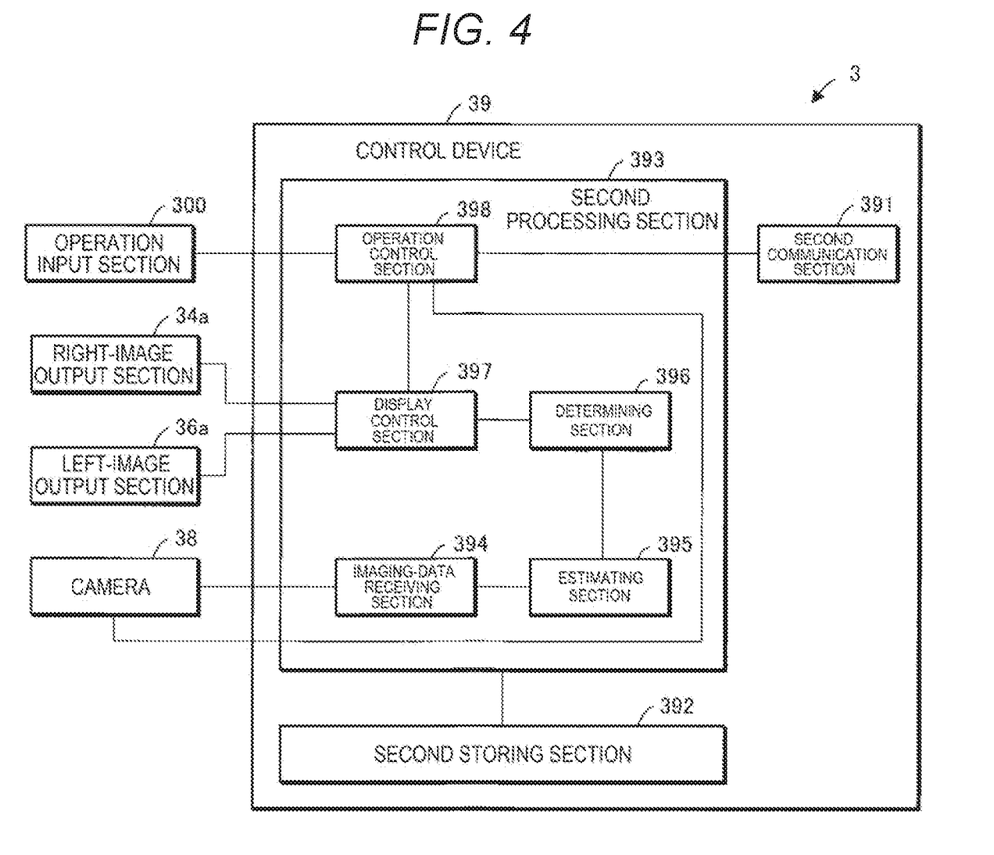
FIG. 4 is a diagram showing an example of a control device.

FIG. 4 is a diagram showing an example of the control device 39. The control device 39 includes a second communication section 391, a second storing section 392, and a second processing section 393.

The second communication section 391 communicates with the projector 1. Specifically, the second communication section 391 communicates with the first communication section 12.

The second storing section 392 is a recording medium readable by the second processing section 393. The second storing section 392 includes, for example, a nonvolatile memory and a volatile memory.

The second storing section 392 stores a control program to be executed by the second processing section 393 and various data to be used by the second processing section 393. The control program stored in the second storing section 392 can be referred to as "application program" or "application software" as well.

The second processing section 393 is configured by, for example, a single or a plurality of processors. As an example, the second processing section 393 is configured by a single or a plurality of CPUs. A part or all of functions of the second processing section 393 may be realized by a circuit such as a DSP, an ASIC, a PLD, or an FPGA. The second processing section 393 executes various kinds of processing in parallel or sequentially.

The second processing section 393 reads the control program from the second storing section 392. The second processing section 393 executes the control program read from the second storing section 392 to there by realize an imaging-data receiving section 394, an estimating section 395, a determining section 396, a display control section 397, and an operation control section 398.

The imaging-data receiving section 394 receives image data from the camera 38. The imaging-data receiving section 394 may be configured by a circuit such as an image receiver or an image reception circuit. The imaging-data receiving section 394 may be configured by an input terminal to which the image data is input.

The estimating section 395 estimates, based on imaging data, a range in which the display image A1 is located in the visual field of the user B, specifically, in each of the right light guide plate 35 and the left light guide plate 37.

For example, as explained below, the estimating section 395 estimates the range in which the display image A1 is located in each of the right light guide plate 35 and the left light guide plate 37. The range in which the display image A1 is located is an example of a specific display range.

The estimating section 395 may be configured by a circuit such as a processor or an estimation circuit.

The determining section 396 determines, based on a result of the estimation executed by the estimating section 395, the position of the operation image R in the right light guide plate 35 and the position of the operation image R in the left light guide plate 37.

For example, the determining section 396 determines, based on the result of the estimation executed by the estimating section 395, the position of the operation image R in the right image QR and the position of the operation image R in the left image QL.

The determining section 396 may be configured by a circuit such as a processor or a determination circuit.

The display control section 397 controls the right-image output section 34a and the left-image output section 36a. The display control section 397 generates right image data indicating the right image QR. In the right image QR, the operation image R is located in the position determined by the determining section 396. The display control section 397 outputs the right image data to the right-image output section 34a. The right-image output section 34a outputs the right image light NR indicating the right image QR indicated by the right image data.

The display control section 397 generates left image data indicating the left image QL. In the left image QL, the operation image R is located in the position determined by the determining section 396. The display control section 397 outputs the left image data to the left-image output section 36a. The left-image output section 36a outputs left image light NL indicating the left image QL indicated by the left image data. The display control section 397 may be configured by a circuit such as a display controller or a display control circuit.

The operation control section 398 controls the projector 1 using the second communication section 391. The operation control section 398 receives operation data from the operation input section 300. The operation control section 398 causes the second communication section 391 to transmit an operation signal based on the operation data to the projector 1. For example, in a situation in which an operation section for adjusting the brightness of an image is used as the operation section E, when the operation data indicates operation on the operation section E, the operation control section 398 causes the second communication section 391 to transmit an operation signal for adjusting the brightness of the image to the projector 1. In other words, the second communication section 391 transmits an operation signal based on the operation data to the projector 1.

The operation control section 398 may be configured by a circuit such as a processor or an operation control circuit.

A6. An Example of the Display Image A1

Figure 5:
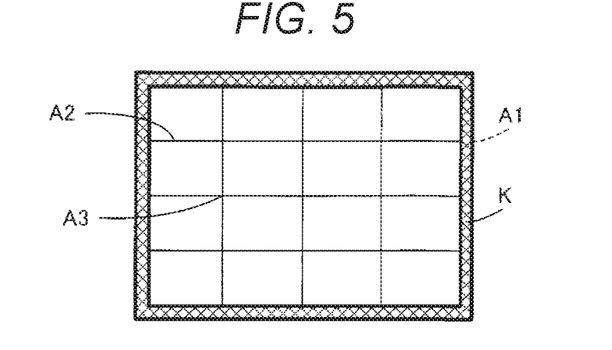
FIG. 5 is a diagram showing an example of a display image.

FIG. 5 is a diagram showing an example of the display image A1. The display image A1 includes a lattice image A2 and the marker K. The lattice image A2 is used to designate an operation target portion in the display image A1. For example, an intersection A3 in the lattice image A2 is designated as the operation target portion by the user B.

A7. An Example of the Right Image QR

FIG. 6 is a diagram showing an example of the right image QR. In the right image QR shown in FIG. 6, a region A4 is shown in order to facilitate understanding of the right image QR. The region A4 is not shown in an actual right image QR. The region A4 overlaps the display image A1 in the first superimposed image T1. The operation image R is located in a region different from the region A4 in the right image QR. The right image QR does not include the operation section E representing the display image A1.

The first operation section E1 receives operation for coloring the lattice image A2 shown in FIG. 5 in green. The second operation section E2 receives operation for coloring the lattice image A2 in red. The third operation section E3 receives operation for coloring the lattice image A2 in blue. The fourth operation section F1 receives operation for moving the operation target portion upward to thereby change the shape of the display image A1. The fifth operation section F2 receives operation for moving the operation target portion downward to thereby change the shape of the display image A1. The sixth operation section F3 receives operation for moving the operation target portion to the right to thereby change the shape of the display image A1. The seventh operation section F4 receives operation for moving the operation target portion to the left to thereby change the shape of the display image A1.

A8. An Example of the First Superimposed Image

Figure 7:
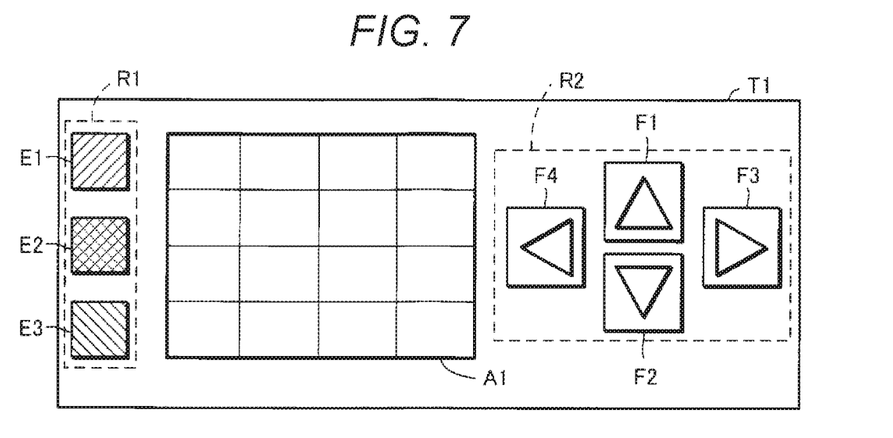
FIG. 7 is a diagram showing an example of a first superimposed image.

FIG. 7 is a diagram showing an example of the first superimposed image T1. In the first superimposed image T1 shown in FIG. 7, the display image A1 shown in FIG. 5 is superimposed on the right image QR shown in FIG. 6. In FIG. 7, for simplification of explanation, the marker K is omitted. In the first superimposed image T1, the operation image R does not overlap the display image A1.

A9. Comparative Example

Figure 8:
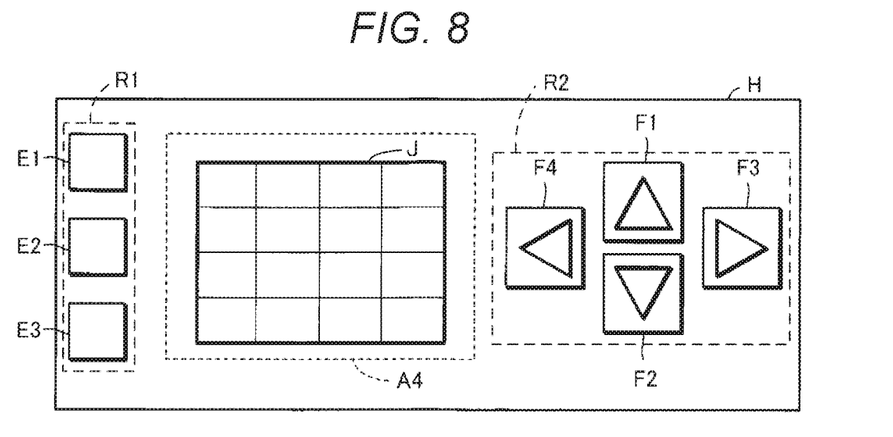
FIG. 8 is a diagram showing a comparative image, which is a comparative example of the right image.
Figure 9:
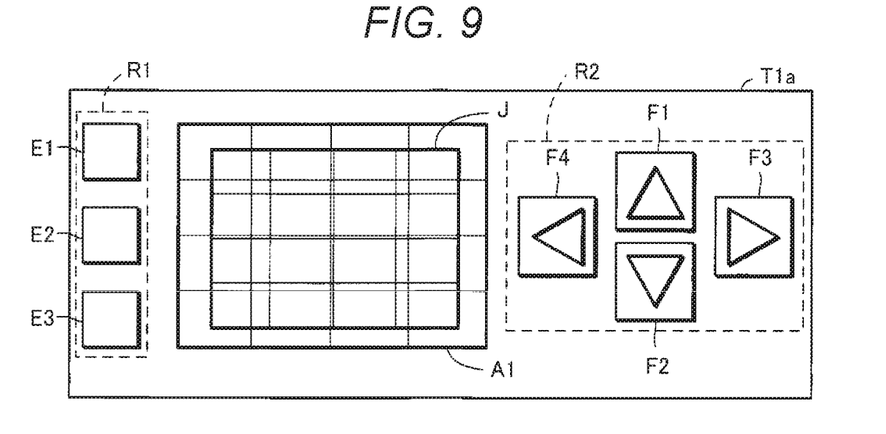
FIG. 9 is a diagram showing an example of a first superimposed image generated when the comparative image is used instead of the right image.

FIG. 8 is a diagram showing a comparative image H, which is a comparative example of the right image QR. The comparative example H is different from the right image QR in that the comparative example H includes an additional operation section J representing the display image A1 and in that an image, specifically, the additional operation section J is located in the region A4. FIG. 9 is a diagram showing an example of a first superimposed image T1a generated when the comparative image H is used instead of the right image QR. As illustrated in FIG. 9, in the first superimposed image T1a, the additional operation section J overlaps the display image A1.

A10. Control of Display in the HMD 3

Figure 10:
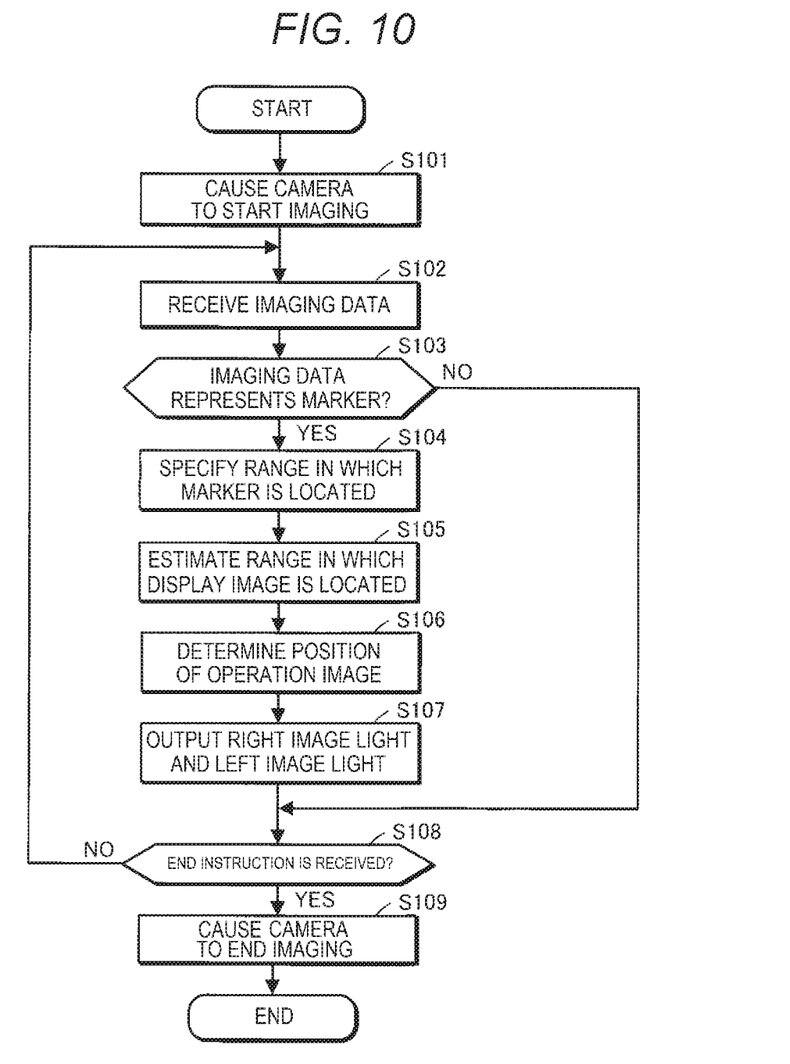
FIG. 10 is a flowchart showing a control operation of display in an HMD.

FIG. 10 is a flowchart showing a control operation for display in the HMD 3. In the following explanation, it is assumed that the user B wears the main body 30 on the head C. When the user B inputs an operation start instruction to the operation input section 300 in order to operate the projector 1, the second processing section 393 reads the control program from the second storing section 392 and executes the control program. Accordingly, the second processing section 393 realizes the imaging-data receiving section 394, the estimating section 395, the determining section 396, the display control section 397, and the operation control section 398.

In step S101, the operation control section 398 causes the camera 38 to start imaging. Since the user B wears the main body 30 on the head C, the camera 38 sets at least a part of the visual field of the user B as the imaging target region. The camera 38 transmits imaging data to the control device 39.

Subsequently, in step S102, the imaging-data receiving section 394 receives the imaging data from the camera 38. The imaging-data receiving section 394 outputs the imaging data to the estimating section 395.

Subsequently, in step S103, the estimating section 395 determines whether the imaging data represents the marker K. In step S103, the estimating section 395 may determine whether a situation in which the imaging data represents the marker K continues for one second or more. In this case, for example, it is possible to exclude the marker K included in an image accidentally captured while the user B is changing the direction of the head C. Accordingly, it is possible to determine whether the marker K that the user B is intentionally viewing is present. One second is an example of a predetermined time. The predetermined time may be longer than one second. The predetermined time may be shorter than one second.

When the imaging data represents the marker K in step S103, in step S104, the estimating section 395 specifies, as a first range, a range in which the marker K is located in a captured image indicated by the imaging data.

Subsequently, in step S105, the estimating section 395 estimates a range in which the display image A1 is located in the visual field of the user B, specifically, in each of the right light guide plate 35 and the left light guide plate 37.

For example, in step S105, first, the estimating section 395 specifies a range surrounded by the first range in the captured image as a second range.

Subsequently, the estimating section 395 specifies a range specified by adding up the first range and the second range as a range in which the display image A1 is located in the captured image.

Subsequently, the estimating section 395 estimates the range in which the display image A1 is located in the captured image as a range in which the display image A1 is located in each of the right light guide plate 35 and the left light guide plate 37. In this case, the estimating section 395 regards, as the visual field of the user B, a range in which the captured image is shown.

The estimating section 395 outputs a result of the estimation to the determining section 396.

Subsequently, in step S106, the determining section 396 determines the position of the operation image R.

For example, in step S106, the determining section 396 determines the position of the operation image R in the right image QR and the position of the operation image R in the left image QL.

As an example, the determining section 396 regards, as the visual field of the user B, an image output region of the right-image output section 34a configured by an OLED or the like. The image output region of the right-image output section 34a is a pixel region in the right-image output section 34a.

The determining section 396 sets a result of the estimation by the estimating section 395, that is, the range in which the display image A1 is located in the visual field of the user B as a display image region in the image output region of the right-image output section 34a.

Subsequently, the determining section 396 determines, as a candidate region, a region different from the display image region in the image output region of the right-image output section 34a.

Subsequently, the determining section 396 determines a position included in the candidate region as the position of the operation image R in the right image QR.

Moreover, the determining section 396 determines a position specified in advance based on the display image region in the candidate region as the position of the operation image R in the right image QR.

Position specifying information indicating the position specified in advance based on the display image region may be stored in advance for each operation image R, for example, in the second storing section 392. In this case, the determining section 396 determines, using the position specifying information, for each operation image R, the position specified in advance based on the display image region as the position of the operation image R in the right image QR.

The determining section 396 determines the position of the operation image R in the left image QL in the same manner as determining the position of the operation image R in the left image QL.

The determining section 396 outputs a result of the determination to the display control section 397.

Subsequently, the display control section 397 generates right image data indicating the right image QR. In the right image QR, the operation image R is located in the position determined by the determining section 396.

Further, the display control section 397 generates left image data indicating the left image QL. In the left image QL, the operation image R is located in the position determined by the determining section 396.

The display control section 397 outputs the right image data to the right-image output section 34a. The display control section 397 outputs the left image data to the left-image output section 36a.

Subsequently, in step S107, the right-image output section 34a outputs the right image light NR indicating the right image QR indicated by the right image data. Further, in step S107, the left-image output section 36a outputs the left image light NL indicating the left image QL indicated by the left image data.

The right image light NR is made incident on the right light guide plate 35 via the right optical system 34b. The right light guide plate 35 superimposes the right image light NR on the first outside scene light M1 to thereby generate the first superimposed light P1. The right light guide plate 35 emits the first superimposed light P1 toward the right eye D1 of the user B.

The left image light NL is made incident on the left light guide plate 37 via the left optical system 36b. The left light guide plate 37 superimposes the left image light NL on the second outside scene light M2 to thereby generate second superimposed light P2. The left light guide plate 37 emits the second superimposed light P2 toward the left eye D2 of the user B.

Accordingly, the user B visually recognizes the display image A1 and the operation section E with the first superimposed light P1 and the second superimposed light P2. For example, the user B visually recognizes an image illustrated in FIG. 7.

Subsequently, when the operation input section 300 does not receive an end instruction in step S108, the processing returns to step S102.

On the other hand, when the operation input section 300 receives the end instruction in step S108, in step S109, the operation control section 398 causes the camera 38 to end the imaging.

When the imaging data does not represent the marker K in step S103, the processing proceeds to step S108.

A11. Control of the Projector 1

Figure 11:
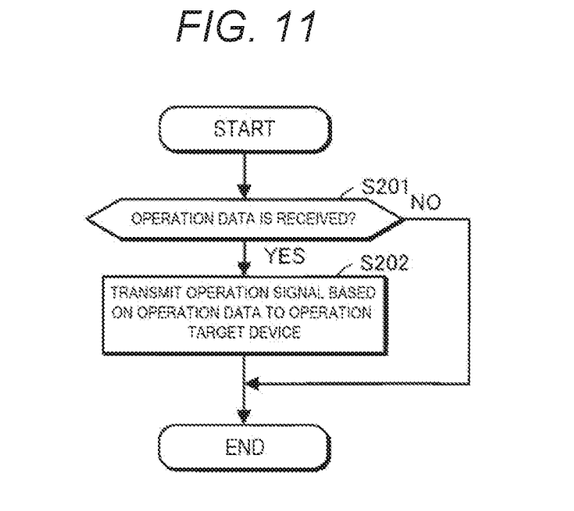
FIG. 11 is a flowchart showing a control operation of the projector by the HMD.

FIG. 11 is a flowchart showing control operation for the projector 1 by the HMD 3. In a situation in which the right-image output section 34a is outputting the right image light NR and the left-image output section 36a is outputting the left image light NL, when the operation input section 300 receives operation on the operation section E by the user B, the operation input section 300 outputs operation data for specifying the operation section E operated by the user B to the main body 30.

When the operation control section 398 receives operation data from the operation input section 300 in step S201, in step S202, the operation control section 398 transmits an operation signal based on the operation data to the projector 1.

For example, when the second operation section E2 shown in FIG. 6 is specified by the operation data, the operation control section 398 transmits, to the projector 1, an operation signal for instructing the projector 1 to color the lattice image A2 shown in FIG. 5 in red.

In the projector 1, when the first communication section 12 receives the operation signal, the first processing section 15 outputs, according to the instruction indicated by the operation signal, image data indicating the display image A1 including the red lattice image A2 to the projecting section 13. Accordingly, the projecting section 13 projects the display image A1 including the red lattice image A2 onto the projection surface 4.

A12. Overview about the First Embodiment

An operation method for the HMD 3 and the HMD 3 according to this embodiment include the following aspects.

The right light guide plate 35 transmits an outside scene appearing in the visual field of the user B. The right light guide plate 35 further displays the operation image R showing the operation section E. The imaging-data receiving section 394 receives imaging data generated by the camera 38 capturing the display image A1 displayed on the projection surface 4. The estimating section 395 estimates, based on the imaging data, a range in which the display image A1 is located in the right light guide plate 35. The determining section 396 determines the position of the operation image R in the right light guide plate 35 based on a result of the estimation executed by the estimating section 395.

According to this aspect, the position of the operation image R is determined by the position of the display image A1. Accordingly, it is possible to suppress the operation image R from becoming less easily seen because of the display image A1.

The determining section 396 determines, as the position of the operation image R in the right light guide plate 35, a position where the operation image R does not overlap a range in which the display image A1 is located.

According to this aspect, the operation image R does not overlap the display image A1. Accordingly, it is possible to suppress the operation image R from becoming less easily seen because of the display image A1.

The display image A1 includes the marker K. The estimating section 395 estimates, based on the position of the marker K represented by the imaging data, a range in which the display image A1 is located in the right light guide plate 35.

According to this aspect, it is possible to easily estimate, by using the marker K, a range in which the display image A1 is located.

The display image A1 is displayed on the projection surface 4 by the projector 1. The operation section E shown in the right image QR receives operation on the projector 1.

According to this aspect, the user B can easily use the operation section E while viewing the display image A1 actually displayed on the projection surface 4 by the projector 1. Therefore, the user B can easily operate the projector 1.

B. Modifications

Aspects of modifications of the embodiment illustrated above are illustrated below. Two or more aspects optionally selected out of the following illustrations may be combined as appropriate in a range in which the aspects do not contradict one another.

B1. First Modification

In the first embodiment, when a ratio of the display image A1 to the right light guide plate 35 is smaller than a threshold, the determining section 396 may determine a position not overlapping the range in which the display image A1 is located as the position of the operation image R in the right light guide plate 35.

The threshold is, for example, a fixed value. Examples of the fixed value include "0.7". The fixed value is not limited to "0.7". The fixed value may be larger than "0.7" or may be smaller than "0.7". When the fixed value is used as the threshold, the determining section 396 may change the size of the operation image R such that the operation image R fits in each of the right image QR and the left image QL.

The threshold may not be a fixed value. For example, the threshold may be a ratio of a default operation image R to the visual field of the user B. In this case, even if the operation image R is set to a default size, it is possible to cause the user B to visually recognize the entire operation image R.

According to this aspect, it is possible to cause the user B to visually recognize the operation image R, for example, in a visually recognizable size without the operation image R overlapping the display image A1.

In the first modification, when the ratio of the display image A1 to the right light guide plate 35 is equal to or larger than the threshold, the determining section 396 may determine, as the position of the operation image R in the right light guide plate 35, a position where at least a part of the operation image R in the right light guide plate 35 overlaps the range in which the display image A1 is located.

Figure 12:
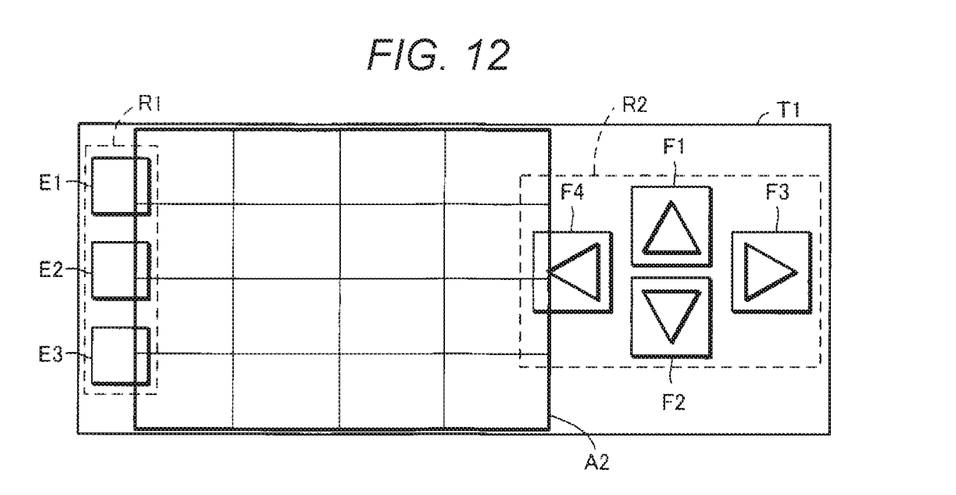
FIG. 12 is a diagram showing an example of the first superimposed image.

FIG. 12 is a diagram showing an example of the first superimposed image T1 generated when the determining section 396 determines, as the position of the operation image R in the right light guide plate 35, the position where at least a part of the operation image R in the right light guide plate 35 overlaps the range in which the display image A1 is located.

In this case, it is possible to prevent the operation image R from being formed excessively small.

B2. Second Modification

The marker K may flash in the first modification of the first embodiment. Specifically, the projector 1 may flash the marker K in the display image A1. At this time, in a period in which the marker K is not displayed, the projector 1 may display an image corresponding to image data received by the image processing section 131 from the image supply device. In this case, the estimating section 395 estimates, based on the position of the flashing marker K represented by imaging data, a range in which the display image A1 is located in the visual field of the user B.

According to this aspect, even if the marker K unnecessary for the user B is intermittently not displayed, it is possible to estimate a range in which the display image A1 is located.

The flashing of the marker K desirably has a frequency equal to or higher than 60 Hz, for example, a frequency of 120 Hz. A human cannot recognize a change in luminance having the frequency equal to or higher than 60 Hz. Accordingly, when the flashing of the marker K has the frequency equal to or higher than 60 Hz, the estimating section 395 can estimate a range in which the display image A1 is located without the flashing of the marker K being visually recognized by the user B.

Since the marker K is flashing, it is possible to make the marker K less conspicuous compared with a configuration in which the marker K does not flash.

B3. Third Modification

In the first embodiment and the first and second modifications, the marker K may be indicated by infrared light. In this case, the estimating section 395 estimates, based on the position of the infrared light represented by imaging data, a range in which the display image A1 is located.

According to this aspect, the marker K unnecessary for the user B is not visually recognized by the user B. Further, the estimating section 395 can estimate, using the infrared light not visually recognized by the user B, a range in which the display image A1 is located in the visual field of the user B. In this aspect, the camera 38 preferably performs imaging via an infrared light filter that does not transmit visible light and transmits the infrared light.

B4. Fourth Modification

In the first embodiment and the first to third modifications, the shape of the marker K is not limited to the shape shown in FIG. 5.

Figure 13:
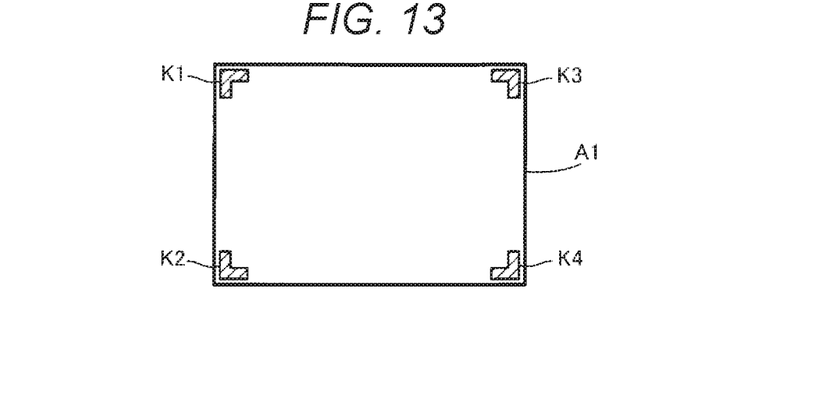
FIG. 13 is a diagram showing another example of a marker.

FIG. 13 is a diagram showing another example of the marker K. The marker K shown in FIG. 13 is formed by L-shaped four markers K1 to K4. The markers K1 to K4 respectively have a first color such as red. A frame having a second color different from the first color is provided in an outer edge portion of the markers K1 to K4. When the first color is red, the second color is, for example, black. A combination of the first color and the second color is not limited to the combination of red and black and can be changed as appropriate.

The markers K1 to K4 are respectively identifiable by the portion having the first color and the portion having the second color. Accordingly, even if a portion different from all of the markers K1 to K4 in the display image A1 has the first color, the estimating section 395 can identify each of the markers K1 to K4 with the frame having the second color. Even if the portion different from all of the markers K1 to K4 in the display image A1 has the second color, the estimating section 395 can identify each of the markers K1 to K4 with the portion having the first color. The frame having the second color may be omitted.

The markers K1 to K4 are respectively disposed at four corners of the display image A1. In this case, first, the estimating section 395 specifies the position, for example, the center of gravity position of each of the markers K1 to K4 indicated by the imaging data. Subsequently, the estimating section 395 determines, as the display image A1, a square having the position of each of the markers K1 to K4 as a vertex. The estimating section 395 may determine, as the display image A1, a square generated by multiplying the area of the square by a predetermined number. The predetermined number is, for example, 1.05. The predetermined number is not limited to 1.05 and can be changed as appropriate.

Figure 14:
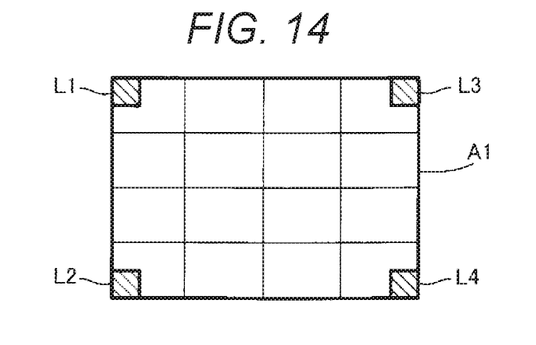
FIG. 14 is a diagram showing still another example of the marker.

FIG. 14 is a diagram showing still another example of the marker K. The marker K shown in FIG. 14 is formed by rectangular four markers L1 to L4. The markers L1 to L4 respectively have the first color. A frame having the second color is provided in an outer edge portion of the markers L1 to L4. The markers L1 to L4 are respectively identifiable by a portion having the first color and a portion having the second color. The frame having the second color may be omitted.

The markers L1 to L4 are respectively disposed at the four corners of the display image A1. In this case, first, the estimating section 395 specifies the position, for example, the center of gravity position of each of the markers L1 to L4 indicated by the imaging data. Subsequently, the estimating section 395 determines, as the display image A1, a square having the position of each of the markers L1 to L4 as a vertex. The estimating section 395 may determine, as the display image A1, a square generated by multiplying the area of the square by a predetermined number.

B5. Fifth Modification

In the first embodiment and the first to fourth modifications, the operation image R is not limited to the shape shown in FIG. 6.

Figure 15:
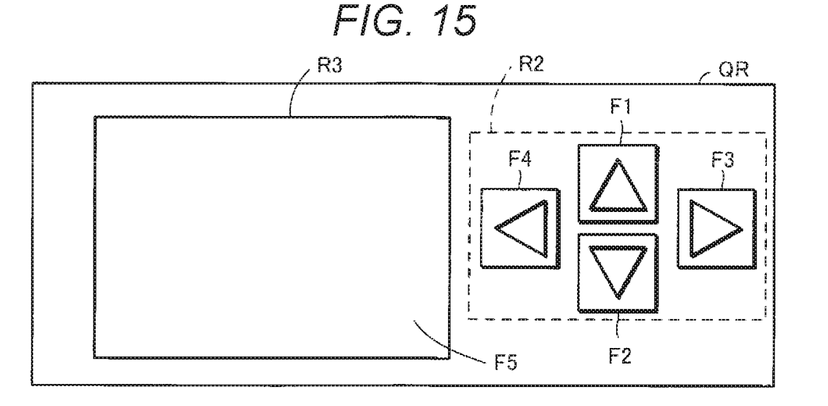
FIG. 15 is a diagram showing the right image including another example of an operation image.

FIG. 15 is a diagram showing the right image QR including another example of the operation image R. The right image QR shown in FIG. 15 shows the second operation image R2 and a third operation image R3. The third operation image R3 shows a range F5 in which the display image A1 can be moved by a lens shift function in the projector 1.

Figure 16:
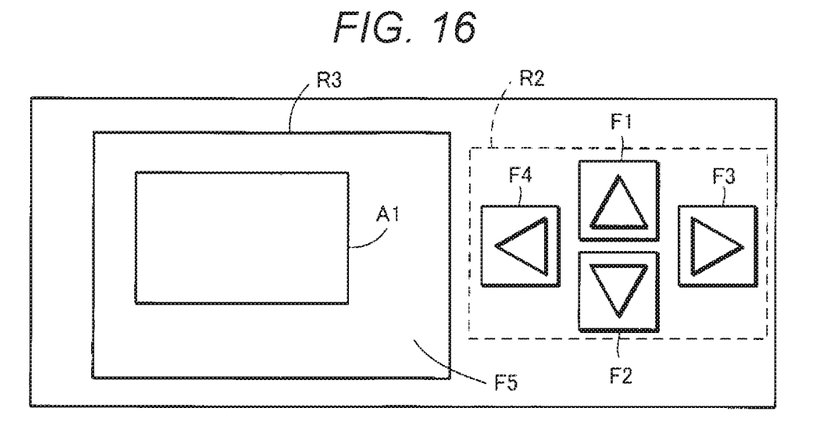
FIG. 16 is a diagram showing an example of the first superimposed image in which the display image is superimposed on the right image shown in FIG. 15.

FIG. 16 is a diagram showing an example of a first superimposed image in which the display image A1 is superimposed on the right image QR shown in FIG. 15. In the example shown in FIG. 16, the operation image R does not overlap the display image A1.

Figure 17:
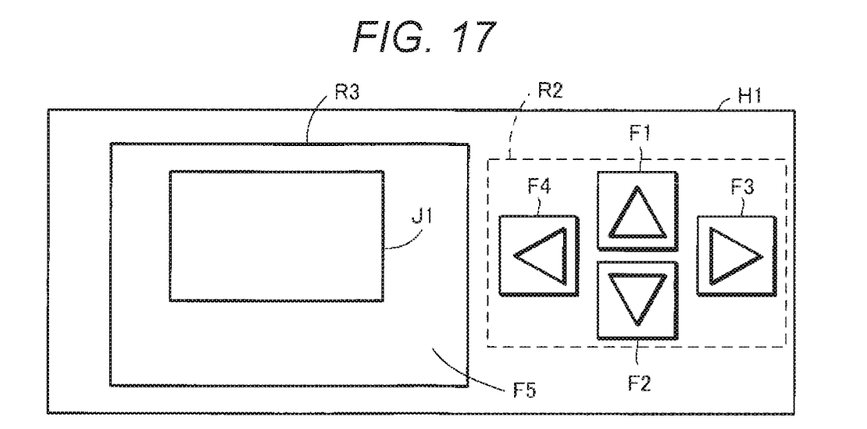
FIG. 17 is a diagram showing a comparative image, which is a comparative example of the right image shown in FIG. 15.

FIG. 17 is a diagram showing a comparative image H, which is a comparative example of the right image QR shown in FIG. 15. The comparative image H1 is different from the right image QR shown in FIG. 15 in that the comparative image H1 includes an additional operation section J1 representing the display image A1 and in that an image, specifically, the additional operation section J is located in the region A4.

Figure 18:
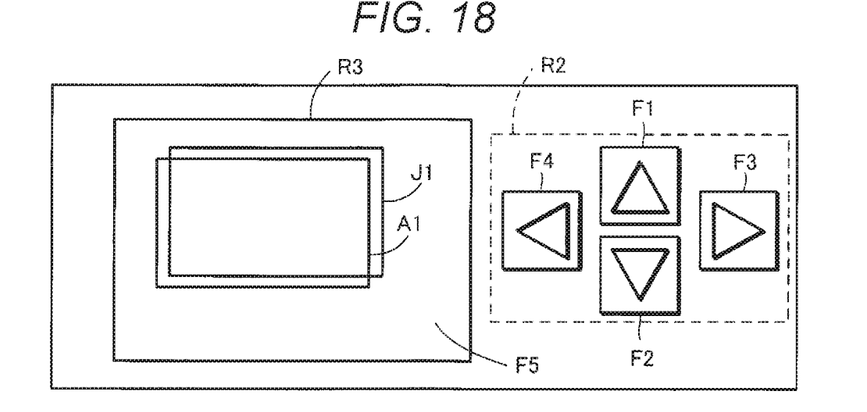
FIG. 18 is a diagram showing an example of a first superimposed image when the comparative image is used instead of the right image shown in FIG. 15.

FIG. 18 is a diagram showing an example of the first superimposed image generated when the comparative image H1 is used instead of the right image QR shown in FIG. 15. In the first superimposed image illustrated in FIG. 18, the additional operation section J1 overlaps the display image A1.

B6. Sixth Modification

In the first embodiment and the first to fifth modifications, the control device 39 may be provided in a device different from the main body 30, for example, a PC. In this case, it is possible to achieve a reduction in the weight of the main body 30.

B7. Seventh Modification

The first embodiment and the first to sixth modifications, the liquid crystal light valve 135 is used as an example of the light modulation device in the projector 1. However, the light modulation device is not limited to the liquid crystal light valve and can be changed as appropriate. For example, the light modulating device may be a device including three reflection-type liquid crystal panels. The light modulation device may be a type including one liquid crystal panel, a type including three digital mirror devices (DMDs), or a type including one digital mirror device. When only one liquid crystal panel or DMD is used as the light modulation device, members equivalent to the color separation optical system and the color combination optical system are unnecessary. Besides the liquid crystal panel and the DMD, a device capable of modulating light emitted by the light source 134 can be adopted as the light modulation device.

B8. Eighth Modification

In the first embodiment and the first to seventh modifications, when the FPD is used as the display device, the FPD may be an FPD used in an electronic blackboard or an electronic conference system.

What is claimed is:

1. An operation method for a head-mounted display device including a display plate configured to transmit outside scene light representing an outside scene appearing in a visual field of a user and display an object image showing an object, the operation method comprising:
receiving imaging data generated by an imaging device imaging a specific region of the outside scene;
estimating, based on the imaging data, a specific display range in which the specific region is displayed in the display plate; and
determining, based on a result of the estimation, a position of the object image in the display plate, wherein light indicating a marker is projected onto the specific region; and the operation method further comprises estimating, based on a position of the marker in a captured image based on the imaging data, a position of the specific display range in the display plate.

2. The operation method for the head-mounted display device according to claim 1, further comprising determining a position of the object image in the display plate as a position not overlapping the specific display range.

3. The operation method for the head-mounted display device according to claim 1, further comprising, when a ratio of the specific display range to the display plate is smaller than a threshold, determining a position of the object image in the display plate as a position not overlapping the specific display range.

4. The operation method for the head-mounted display device according to claim 3, further comprising, when the ratio of the specific display range to the display plate is equal to or larger than the threshold, determining the position of the object image in the display plate as a position where at least a part of the object image in the display plate overlaps the specific display range.

5. The operation method for the head-mounted display device according to claim 1, wherein the marker flashes.

6. The operation method for the head-mounted display device according to claim 5, wherein the flashing of the marker has a frequency equal to or higher than 60 Hz.

7. The operation method for the head-mounted display device according to claim 1, wherein the marker is indicated by infrared light.

8. The operation method for the head-mounted display device according to claim 1, wherein
a light representing an image of a display target is projected onto the specific region by an operation target display device, and
the object is an operation section configured to receive operation on the operation target display device.

9. A head-mounted display device including a display plate configured to transmit outside scene light representing an outside scene appearing in a visual field of a user and display an object image showing an object, the head-mounted display device comprising:
at least one processor configured to:
receive imaging data generated by an imaging device imaging a specific region of the outside scene;
estimate, based on the imaging data, a specific display range in which the specific region is displayed in the display plate; and
determine, based on a result of the estimation, a position of the object image in the display plate, wherein light indicating a marker is projected onto the specific region and the at least one processor is further configured to estimate, based on a position of the marker in a captured image based on the imaging data, a position of the specific display range in the display plate.

10. An operation method for a head-mounted display device including a display plate configured to transmit outside scene light representing an outside scene appearing in a visual field of a user and display an object image showing an object, the operation method comprising:
receiving imaging data generated by an imaging device imaging a specific region of the outside scene:
estimating, based on the imaging data, a specific display range in which the specific region is displayed in the display plate; and
determining, based on a result of the estimation, a position of the object image in the display plate;
wherein a light representing an image of a display target is projected onto the specific region by an operation target display device, and
the object is an operation section configured to receive operation on the operation target display device.

11. The operation method for the head-mounted display device according to claim 10, further comprising determining a position of the object image in the display plate as a position not overlapping the specific display range.

12. The operation method for the head-mounted display device according to claim 10, further comprising, when a ratio of the specific display range to the display plate is smaller than a threshold, determining a position of the object image in the display plate as a position not overlapping the specific display range.

13. The operation method for the head-mounted display device according to claim 12, further comprising, when the ratio of the specific display range to the display plate is equal to or larger than the threshold, determining the position of the object image in the display plate as a position where at least a part of the object image in the display plate overlaps the specific display range.

* * * * *